United States Patent [19]
Mayer et al.
[11] Patent Number: 4,666,682
[45] Date of Patent: May 19, 1987

[54] DISPENSER FOR SOLID AND POWERED DETERGENT

[75] Inventors: James L. Mayer, 17271 Amaganset Way, Tustin, Calif. 92680; William K. Russell, Costa Mesa, Calif.

[73] Assignee: James L. Mayer, Tustin, Calif.

[21] Appl. No.: 801,587

[22] Filed: Nov. 25, 1985

[51] Int. Cl.[4] .............................................. B01D 11/02
[52] U.S. Cl. .................................... 422/266; 422/274; 222/1; 222/189; 222/517
[58] Field of Search ................................ 422/266–268, 422/274, 275, 283; 222/1, 189, 517, 556

[56] References Cited

U.S. PATENT DOCUMENTS

| | | | |
|---|---|---|---|
| 1,930,500 | 10/1933 | Archibald | 422/283 X |
| 2,563,652 | 8/1951 | Le Gore | 422/266 X |
| 3,416,897 | 12/1968 | Long et al. | 422/266 X |
| 3,595,438 | 7/1971 | Daley et al. | 422/274 X |
| 3,850,344 | 11/1974 | Burge et al. | 222/189 X |
| 4,571,327 | 2/1986 | Larson et al. | 422/266 X |

*Primary Examiner*—Tom Wyse
*Attorney, Agent, or Firm*—Willie Krawitz

[57] ABSTRACT

A device is disclosed for safely inserting and removing a container of solid or powder detergent cleaner into a detergent dispenser such as for a dishwasher. The device includes a bowl portion and a central, upstanding water spray outlet near the bottom of the bowl which ejects water into the container to remove the detergent from the container, or from bulk powder fed into the bowl.

One or more fingers is attached to the inside of the bowl and is biased inwardly by a spring to occlude the spray outlet. When the container of detergent is inserted into the bowl, it biases the finger outwardly and exposes the spray outlet to the detergent. Upon removal of the container from the bowl, it will move out of contact with the finger, which is again biased inwardly by the spring to occlude the spray outlet and protect the operator.

Dissolved detergent and wet powder and particles are deposited on, and seep through, a perforated plate or screen adjacent the spray outlet. Solid detergent on the plate is rapidly mixed in a vortex of swirling water in the bowl that is formed by spray jets positioned below the plate, and the mixture of slurry and solution is flushed directly into a wash tank of the dishwasher.

11 Claims, 3 Drawing Figures

DISPENSER FOR SOLID AND POWERED DETERGENT

BACKGROUND OF THE INVENTION

This invention relates to a new and improved device for safely inserting and removing a container of detergent from a detergent dispenser, and for effectively removing these materials from the container for use, typically in a dishwasher.

Various types of protection devices have been employed to protect dishwasher operations from the effects of backsplash or water ejection from detergent dispensers, and these include: splashguards, closure tops which electrically actuate a cut-off valve, specially designed closure mechanisms, and special container designs. However, many of these protection devices present problems in terms of complexity of construction, cost, reliability, ease of use, and electrical connections.

Also, many types of dispensers produce a solution build-up. The immersion of the detergent formula into the solution in the dispenser results in two undesireable effects. Firstly, the water will differentially dissolve the various ingredients in the formula, causing a wide variation in the formulation which is fed to the dishwasher. Secondly, if the detergent includes a chlorine containing compound, this solution build-up will tend to evaporate the chlorine from the solution rather than passing it to the dishwasher. This not only wastes the chlorine compound, but also the chlorine in vapor form is toxic, and especially so when it has been heated.

Frequently, detergent containers do not have a uniform size. Hence, it would be useful to provide a device which can accomodate most container sizes and shapes and still retain safety features such as protection of the operator from backsplash, and the ejection of hot liquid, steam and detergent, both powder and liquid.

THE INVENTION

According to the invention, a detergent feed device for a detergent dispenser is provided to minimize backsplash and the hazard due to ejection of water, and detergent, possibly into an operator's face; prevent the differential dissolving of detergent; and, increase the feed rate of solid and powdered detergent, which is especially important in the case of short cycle dishwashers.

The device comprises an upwardly open-ended bowl container for receiving an open inverted container of solid or powdered detergent and for removing detergent therefrom by means of an upwardly directed spray or jet of water from an upstanding water jet positioned at the lower portion of the bowl. The bowl container provides a narrow, inwardly biased (preferably spring loaded) finger, which in the closed position occludes the water outlet and prevents water from being ejected from the bowl and onto the operator or persons near the dishwasher. When the container of detergent is inserted into the bowl, it will bias the finger outwardly and away from the outlet. This exposes water from the jet to be ejected into the detergent in the container and causes the detergent to be removed. When the container is withdrawn from the bowl, the finger will be released, and will be biased inwardly to occlude the outlet. Hence, the ejection of water and detergent, etc., from the bowl is prevented.

In the case of powder which is intentionally or accidentally placed into the dispenser, water spray from the finger is deflected horizontally onto the powder and forms a slurry. Subsequently, this slurry is fed to a water vortex which causes the slurry to become thin and uniform prior to being flushed to the dishwasher.

A perforated screen is positioned at the level of the jet outlet and functions to prevent unwetted powder from falling freely into the bottom of the dispenser and plugging up the outlet. Consequently, detergent powder is spread outwardly along the perforated screen, and this enables the powder to be contacted by a vortex of water along the periphery of the dispenser. A centrally disposed gravity outlet extends upwardly for a short distance from the bottom of the dispenser to maintain a shallow basin of water. When the dispenser is activated, a vortex is formed in this water basin and causes the detergent powder to be slurried and thinned. Hence, there is little or no possibility of the powder solidifying and plugging either the outlet or a band in an outlet pipe or bulkhead fitting. The bottom of the dispenser is flat shaped to establish a shallow basin of water and enable a suitable water vortex to be formed. The vortex of water is forced up through the perforated screen and along the sidewall of the dispenser. This causes the powder to be continuously and uniformly eroded and slurried. Consequently, the detergent slurry or solution has the same uniformity as the detergent in the container. Moreover, any chlorine containing compounds are removed to the dishwasher also as a solution or slurry, and hence the chlorine content will not be dissipated into the ambient air.

In effect, the detergent is dissolved, slurried and diluted in two stages, the first stage occuring in the container due to the upstanding water outlet, and the second stage occurring at and below the perforated screen from the vortex forming jets.

Where bulk detergent powder is employed exclusively, that is, it is unloaded by hand rather than being fed from a container, the spring loaded finger can be replaced by a rigid bracket attached to the perforated plate. The bracket functions to continuously deflect water in a horizontal manner, as in the case of the spring loaded finger.

When an empty container of detergent is removed from the bowl, the finger will be biased inwardly and occlude the water jet. This will protect the operator from being splashed by a combination of steam, hot water and detergent. Consquently, the dishwasher will not have to be shut down or special precautions taken to protect the operator when a container of detergent is inserted or removed when the dishwasher is operating. The inward biasing of the finger and occlusion of the water jet is independant of the distance between the bowl wall and the container of detergent. Therefore, many different sizes of detergent containers may be used in the device without difficulty.

Safety features of the dispenser include the use of the screen as a component of the dispenser. This obviates the need to use a similar screen to cover the mouth of the detergent container. Consequently, the mouth of the detergent container may be used completely open; therefore, the container will not become plugged and produce a pressure build-up, as can presently occur. Furthermore, use of the screen causes splashing to occur at the level of the upstanding water jet, rather than taking place at the outlet of the dispenser. The inwardly biased finger is, of course, another safety feature. Optionally if desired, a lid cover may be employed when powdered detergent is being used in bulk form and simply unloaded by hand rather than being fed from a container.

DESCRIPTION OF THE PREFERRED EMBODIMENTS

Figure 1:
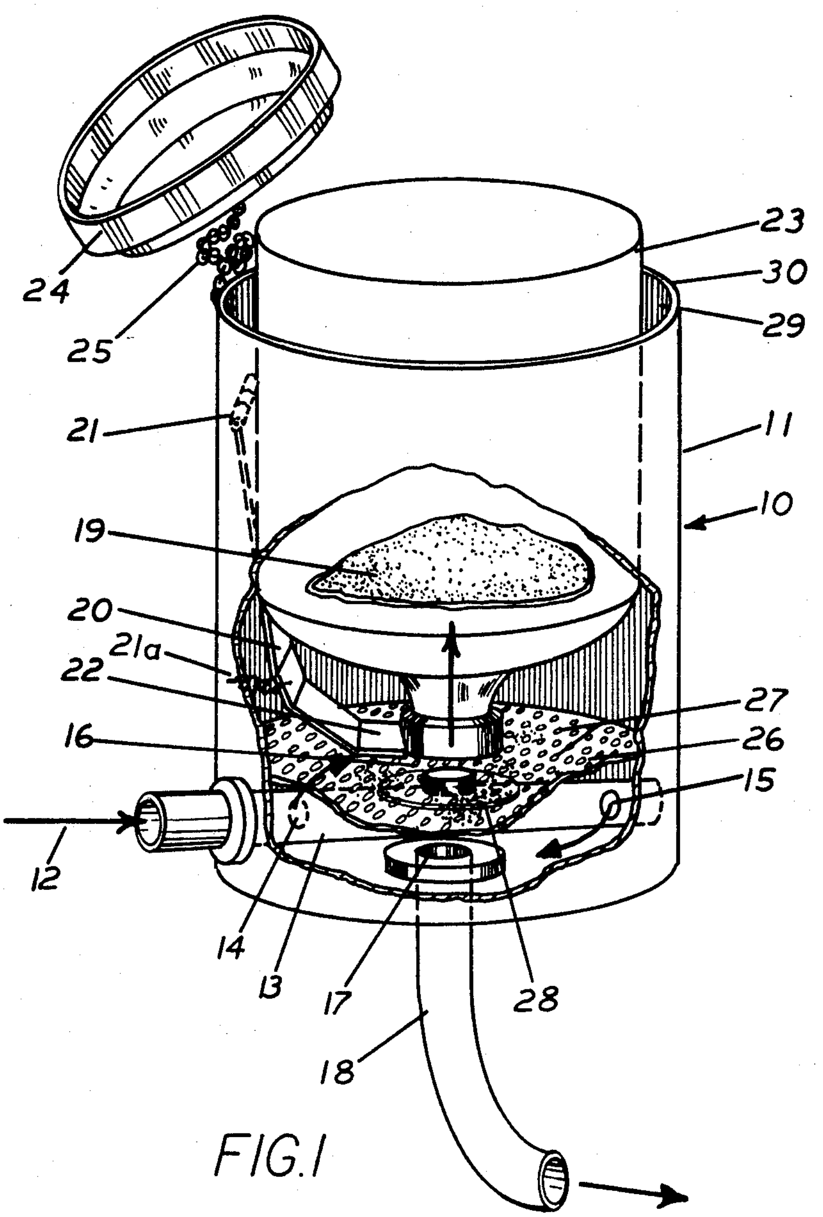
FIG. 1 is a side elevation view, partly broken away, in perspective, showing the device of the invention having inserted therein an inverted container of detergent.
Figure 2:
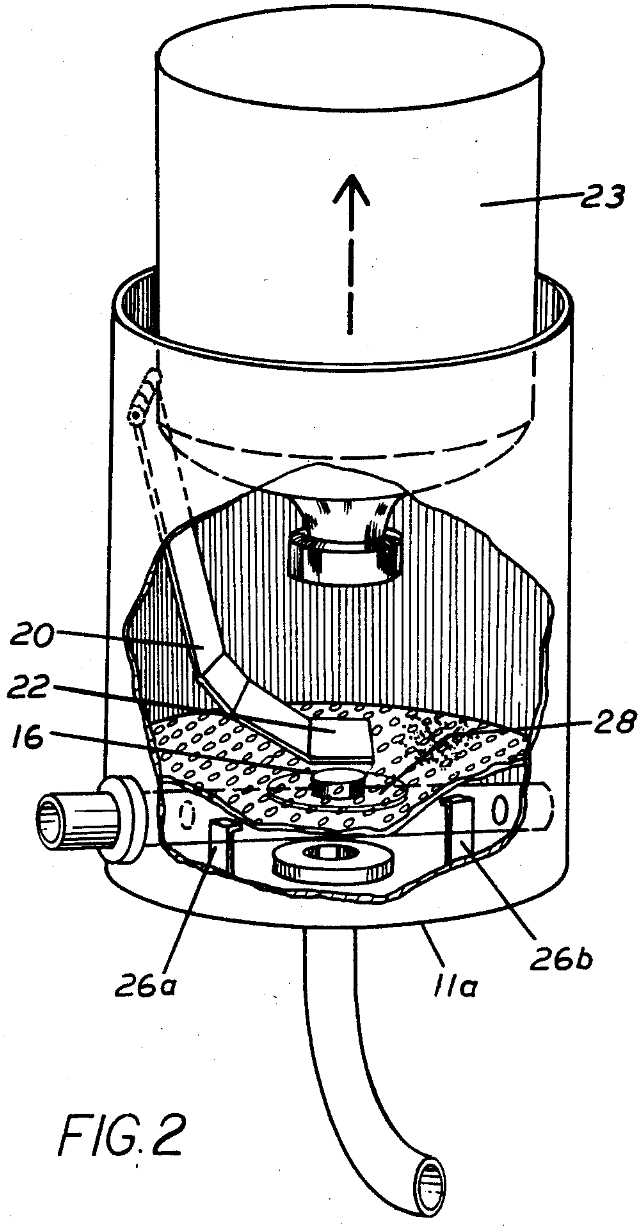
FIG. 2 is a side elevation view, partly broken away, in perspective showing the lower portion of the device following removal of the detergent container, or prior to complete insertion; and, FIG. 3 is a view in sectional side elevation showing a rigid bracket employed to occlude a water jet outlet, and to deflect water.

The detergent dispenser 10 of this invention is shown in FIGS. 1 and 2, and comprises an upwardly open deep bowl container 11 that is attached to a dishwasher (not shown). A water inlet 12 extends into the lower portion of the dispenser and feeds a manifold 13 having outlet jets 14, 15 and an upstanding outlet 16 located centrally of the bowl. A non plugging drain 17 leading to an outlet tube 18 at the bottom of the container 11 feeds detergent 19 which is removed from the container into the dishwasher.

The interior of the bowl container 11 is provided with a narrow finger 20 which is rotationally mounted on the inside wall of the container by a pivot 21 and biased inwardly by a spring element 21*a*. As shown in FIG. 2, an end extension 22 of the finger 20 is sized to cover or occlude the outlet 16.

This prevents hot water, solid detergent, detergent solution, steam, etc., from being ejected out of the bowl container when the detergent carton has been removed, or when the detergent carton 23 is being removed from or being inserted into the bowl. If desired, a cover plate 24 attached to the bowl by a chain 25 may be used to cover the open end of the bowl container when bulk detergent powder is unloaded into the bowl.

A screen 26 having perforations 27 is positioned adjacent and preferably level with, the upstanding outlet 16. The screen is supported by legs that are spot welded thereto, two legs 26*a*, 26*b* being shown. Positioned below the screen is a small deflector plate 28, which may be preferably employed, in conjunction with the screen. The deflector plate and screen both function to prevent dry detergent powder from sifting through the screen to the drain 17. Hence, the powder will be dissolved or slurried, rather than passing through the drain in dry form.

Water from the inlet 12 is fed to the outlet jets 14, 15 and is circulated in the direction shown by the arrows. Since the bottom 11*a* of the container 11 is flat, a water vortex is formed due to the circulation produced by the jets. This vortex will move upwardly along the sidewall of the bowl and through the screen to dissolve and slurry the detergent. At the same time, water from the upstanding outlet 16 is injected into the powdered detergent in the container. The entire effect of the jets 14, 15 and outlet 16 is to uniformly dissolve and slurry the detergent. The drain 17 extends upwardly for a short distance from the bottom 11*a* of the container and maintains a shallow (about $\frac{1}{2}''$) water reservoir at the bottom of the container 11. The presence of the water reservoir enables a water vortex to be formed quickly and minimizes the possibility of the drain and associated tubing from becoming plugged.

It will be observed that the bowl container 11 is sized to provide a considerable amount of extra space 29 between the detergent container 23 and the sidewall 30 of the bowl container. This extra space enables a wide variety of container sizes and shapes to be employed in the device.

Figure 3:
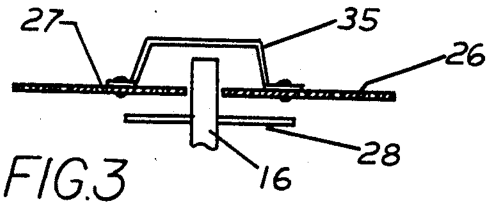

FIG. 3 shows another embodiment of the invention which may be used if the operator employs detergent powder exclusively. A cover plate 35 is fixed in place by bolting to the screen 26 and occludes the upstanding outlet 16; this prevents water from being ejected out of the bowl and onto the operator. Water from the outlet 16 will be deflected horizontally onto powder on the screen to dissolve and slurry the powder.

Thus the present invention will protect the operator at all times, irrespective of whether the detergent is being removed from its container, whether a container is being replaced, or whether the bowl is completely open. Also, the device can be used with a wide variety of container sizes without requiring a bowl change. Additionally, the device can be used with detergent powder that is not containerized but is simply unloaded into the bowl in bulk form.

Obviously, many equivalents of the invention are possible without departing from the spirit thereof. For example, vertical guides may be employed to center a container within the bowl. Also, additional jet outlets could be positioned peripherally along the side wall of the bowl and directed towards the screen 26. Furthermore, it will be appreciated that conventional components in dishwasher systems may be used with the present dispenser, such as conductivity sensors to monitor the detergent concentration and activate the water jets.

We claim:

1. A detergent dispenser, comprising:

a. a bowl member, defining an inner wall portion, an open end portion oriented upwardly, a lower closed portion in which are mixed detergent and water to form a solution and a slurry of detergent, and a drain for removing the detergent solution by gravity;

b. a water supply line leading into the bowl at the lower closed portion;

c. a centrally disposed upstanding water outlet connected to the water supply line for producing an upwardly directed spray or jet of water through an outlet orifice;

d. at least one spray jet orifice on the water supply for contacting detergent in the bowl with water;

e. a perforated screen adjacent the outlet orifice of the upstanding water outlet to retain the detergent during contact with water; and f. a normally inwardly biased finger connected to the inner wall, the finger being shaped to occlude the orifice of the upstanding water outlet in the inwardly biased porition and expose the said orifice when biased outwardly; whereby:

i. when a container of detergent is inverted into the open end of the bowl, it will outwardly bias the finger and expose the orifice of the upstanding water outlet, thereby enabling water from the outlet to slurry and dissolve detergent in the container;

ii. solid detergent which collects on the perforated strainer plate will be dissolved and slurried by water from the upstanding outlet and will pas through the screen into the drain; and iii. when the container of detergent is removed from the bowl, the finger will be inwardly biased to cover the orifice of the water outlet and prevent water and detergent from being ejected out of the bowl.

2. The dispenser of claim 1, comprising spring biasing means for said finger.

3. The dispenser of claim 1, comprising a fixed bracket mounted on the screen and adapted to occlude the outlet orifice of the upstanding water outlet and to deflect water from the orifice onto detergent on the screen.

4. The dispenser of claim 1, in which the detergent is in the form of a solid or powder.

5. The dispenser of claim 1, comprising a plate member positioned below the screen and above the drain, the plate member being adapted to occlude the drain from free falling detergent powder.

6. The dispenser of claim 1, in which the bowl member is circular, and the spray jet orifices of the water supply line are directed to feed water tangentially, and in a circular manner around the bowl, thereby producing a water vortex.

7. The dispenser of claim 6, in which the lower closed portion of the bowl member provides a flat bottom, and the drain projects a sufficient distance upwardly from the bottom, thereby enabling a water reservoir to be established in the bowl and maintain the said vortex, thereby enabling detergent powder to be uniformly dissolved, slurried and diluted.

8. The dispenser of claim 7, comprising a fixed bracket mounted on the screen and adapted to occlude the outlet orifice of the upstanding water outlet and to deflect water from the orifice onto the screen.

9. The dispenser of claim 8, comprising a plate member positioned below the screen and above the drain, the plate member being adapted to occlude the drain from free falling detergent powder.

10. A method for dispensing detergents, comprising:

a. inserting a downwardly open container of detergent into a detergent bowl having an upwardly open end;

b. feeding water from a feed line into the bowl at a lower portion thereof to a centrally positioned, upstanding water outlet, and to at least one spray jet for circulating water in the bowl;

c. collecting undissolved detergent on a perforated strainer plate positioned below the upstanding water outlet;

d. flushing detergent from the container with upwardly directed water from the upstanding outlet, and flushing detergent on the strainer plate with water from the spray jet;

e. draining slurried and dissolved detergent from the bowl by gravity through a drain positioned at the bottom of the bowl; and, f. occluding the upstanding water outlet with an inwardly biased finger connected to the bowl; whereby:

i. when the container is inserted into the bowl, it will bias the finger outwardly and expose water from the upstanding outlet to detergent in the container;

ii. solid detergent which collects on the perforated strainer plate will be dissolved and slurried by water from the upstanding outlet and will pass through the screen into the drain; and, iii. when the container of detergent is removed from the bowl, the finger will be inwardly biased to cover the orifice of the water outlet and prevent water and detergent from being ejected out of the bowl.

11. The method of claim 10, in which the circulating water forms a vortex that passes upwardly through the plate.

* * * * *